US012418492B2

(12) United States Patent
Soelberg et al.

(10) Patent No.: US 12,418,492 B2
(45) Date of Patent: *Sep. 16, 2025

(54) TUNABLE LOW COST NETWORK

(71) Applicants: AT&T Intellectual Property I, L.P., Atlanta, GA (US); AT&T Mobility II LLC, Atlanta, GA (US)

(72) Inventors: Emily Soelberg, Atlanta, GA (US); Nabil Mastan, Atlanta, GA (US); Venson Shaw, Kirkland, WA (US); Sangar Dowlatkhah, Johns Creek, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 274 days.

This patent is subject to a terminal disclaimer.

(21) Appl. No.: 18/171,962

(22) Filed: Feb. 21, 2023

(65) Prior Publication Data

US 2023/0208736 A1 Jun. 29, 2023

Related U.S. Application Data

(63) Continuation of application No. 17/227,767, filed on Apr. 12, 2021, now Pat. No. 11,611,499, which is a (Continued)

(51) Int. Cl.
*H04L 41/0896* (2022.01)
*H04L 41/0813* (2022.01)
(Continued)

(52) U.S. Cl.
CPC .......... *H04L 47/28* (2013.01); *H04L 41/0813* (2013.01); *H04L 41/0896* (2013.01);
(Continued)

(58) Field of Classification Search
None
See application file for complete search history.

(56) References Cited

U.S. PATENT DOCUMENTS

| 3,233,170 A | 2/1966 | Rogers et al. |
| 6,553,006 B1 | 4/2003 | Kalliokulju et al. |
| | (Continued) | |

FOREIGN PATENT DOCUMENTS

| CN | 100571175 C | 12/2009 |
| CN | 104184788 A | 12/2014 |
| | (Continued) | |

OTHER PUBLICATIONS

"Machine-to-Machine communications (M2M); M2M service requirements", ETSI, etsi.org, Technical Specification, ETSI TS 102 689 V1.1.1, Aug. 2010.

(Continued)

*Primary Examiner* — Benjamin Lamont
(74) *Attorney, Agent, or Firm* — Guntin & Gust, PLC; Erik Boyd

(57) ABSTRACT

Aspects of the subject disclosure may include, for example, a method comprising providing services over a network to a device, and constructing device capability and usage profiles. A level of service quality for the device is adjusted by adjusting a latency criterion regarding connection of the device to the network; adjusting a speed of transmissions to or from the device; and altering a routing of transmissions to or from the device. The network can be partitioned so that the adjusted service quality level is provided by a network portion having a predetermined level of resources. The adjusted service quality level can comprise a first level while the device is active and a second level while the device is inactive; the first level is higher than the second level. The first and second levels are lower than a service quality level (Continued)

provided by another network portion. Other embodiments are disclosed.

20 Claims, 9 Drawing Sheets

Related U.S. Application Data continuation of application No. 16/421,012, filed on May 23, 2019, now Pat. No. 11,005,743, which is a continuation of application No. 15/188,254, filed on Jun. 21, 2016, now Pat. No. 10,341,209.

(51) Int. Cl.
*H04L 43/0876* (2022.01)
*H04L 43/0882* (2022.01)
*H04L 47/10* (2022.01)
*H04L 47/28* (2022.01)
*H04L 67/303* (2022.01)
*H04L 41/5025* (2022.01)
*H04L 43/16* (2022.01)
*H04W 4/70* (2018.01)

(52) U.S. Cl.
CPC ...... *H04L 43/0876* (2013.01); *H04L 43/0882* (2013.01); *H04L 47/10* (2013.01); *H04L 67/303* (2013.01); *H04L 41/5025* (2013.01); *H04L 43/16* (2013.01); *H04W 4/70* (2018.02)

(56) References Cited

U.S. PATENT DOCUMENTS

| | | |
|---|---|---|
| 7,197,048 B1 | 3/2007 | Duffield et al. |
| 8,018,955 B2 | 9/2011 | Agarwal et al. |
| 8,125,897 B2 | 2/2012 | Ray et al. |
| 8,144,586 B2 | 3/2012 | McNaughton et al. |
| 8,149,771 B2 | 4/2012 | Khivesara et al. |
| 8,339,954 B2 | 12/2012 | Dahod et al. |
| 8,463,933 B2 | 6/2013 | Harrang et al. |
| 8,750,158 B2 | 6/2014 | Morrill et al. |
| 9,224,169 B2 | 12/2015 | Smith |
| 9,240,906 B2 | 1/2016 | Edwards |
| 9,241,277 B2 | 1/2016 | Kozisek |
| 2005/0007955 A1 | 1/2005 | Schrodi |
| 2005/0226249 A1 | 10/2005 | Moore et al. |
| 2010/0312612 A1 | 12/2010 | Carr et al. |
| 2013/0275578 A1 | 10/2013 | Williams et al. |
| 2013/0286875 A1 | 10/2013 | Morrill et al. |
| 2013/0304878 A1 | 11/2013 | Russell et al. |
| 2014/0226485 A1 | 8/2014 | Heinz et al. |
| 2014/0297847 A1 | 10/2014 | Heinz et al. |
| 2015/0111607 A1 | 4/2015 | Baldwin |
| 2015/0118999 A1 | 4/2015 | Merchant |
| 2015/0280976 A1 | 10/2015 | Hirsch |
| 2015/0295998 A1 | 10/2015 | Morrill |
| 2015/0356633 A1 | 12/2015 | Kakadia et al. |
| 2016/0113025 A1 | 4/2016 | Shaw et al. |
| 2016/0157147 A1 | 6/2016 | Saghir et al. |
| 2017/0086090 A1 | 3/2017 | Sharma et al. |
| 2017/0366462 A1 | 12/2017 | Soelberg |
| 2018/0109974 A1 | 4/2018 | Fitch et al. |
| 2019/0280956 A1 | 9/2019 | Soelberg et al. |
| 2021/0234783 A1 | 7/2021 | Soelberg et al. |

FOREIGN PATENT DOCUMENTS

| | | |
|---|---|---|
| FI | 115094 B | 2/2005 |
| KR | 10-2012-0130223 | 11/2012 |
| WO | 2008005393 A2 | 1/2008 |

OTHER PUBLICATIONS

"SDN and the Future of Service Provider Networks", Fujitsu, ofccconferene.org, 2013.
"The Digital Network 3.0 in the Services Providers of 2020: Creating Value from Disruption", Accenture, accenture.com, 2015.
Calisti, Monique et al., "Autonomic Service Access Management for Next Generation Converged Networks", Advanced Autonomic Networking and Communication. Birkhauser Basel, 101-126, 2007.
Cisco, "Service Level Management: Best Practices White Paper", cisco.com, Oct. 4, 2005.
D'Arienzo, Maurizio et al., "Dynamic service management in heterogeneous networks", Journal of Network and Systems Management 12.3, 349-370., 2004.

100

200

300

TUNABLE LOW COST NETWORK

CROSS REFERENCE TO RELATED APPLICATIONS

This application is a continuation of U.S. application Ser. No. 17/227,767, filed Apr. 12, 2021, which is a continuation of U.S. application Ser. No. 16/421,012, filed May 23, 2019 (now U.S. Pat. No. 11,005,743, issued on May 11, 2021), which is a continuation of U.S. application Ser. No. 15/188,254, filed Jun. 21, 2016 (now U.S. Pat. No. 10,341,209, issued on Jul. 2, 2019), which are incorporated herein by reference in their entirety.

FIELD OF THE DISCLOSURE

The subject disclosure relates to a communication network that connects to a variety of devices and provides network services to those devices at reduced cost.

BACKGROUND

A very wide variety of devices with differing device capabilities may connect to a communication network at various times and for various purposes (for example, a sensor periodically transmitting small amounts of data to a computing device). A network that includes such devices is sometimes referred to as the "Internet of things" (IOT).

BRIEF DESCRIPTION OF THE DRAWINGS

Reference will now be made to the accompanying drawings, which are not necessarily drawn to scale, and wherein.

DETAILED DESCRIPTION

Figure 1:
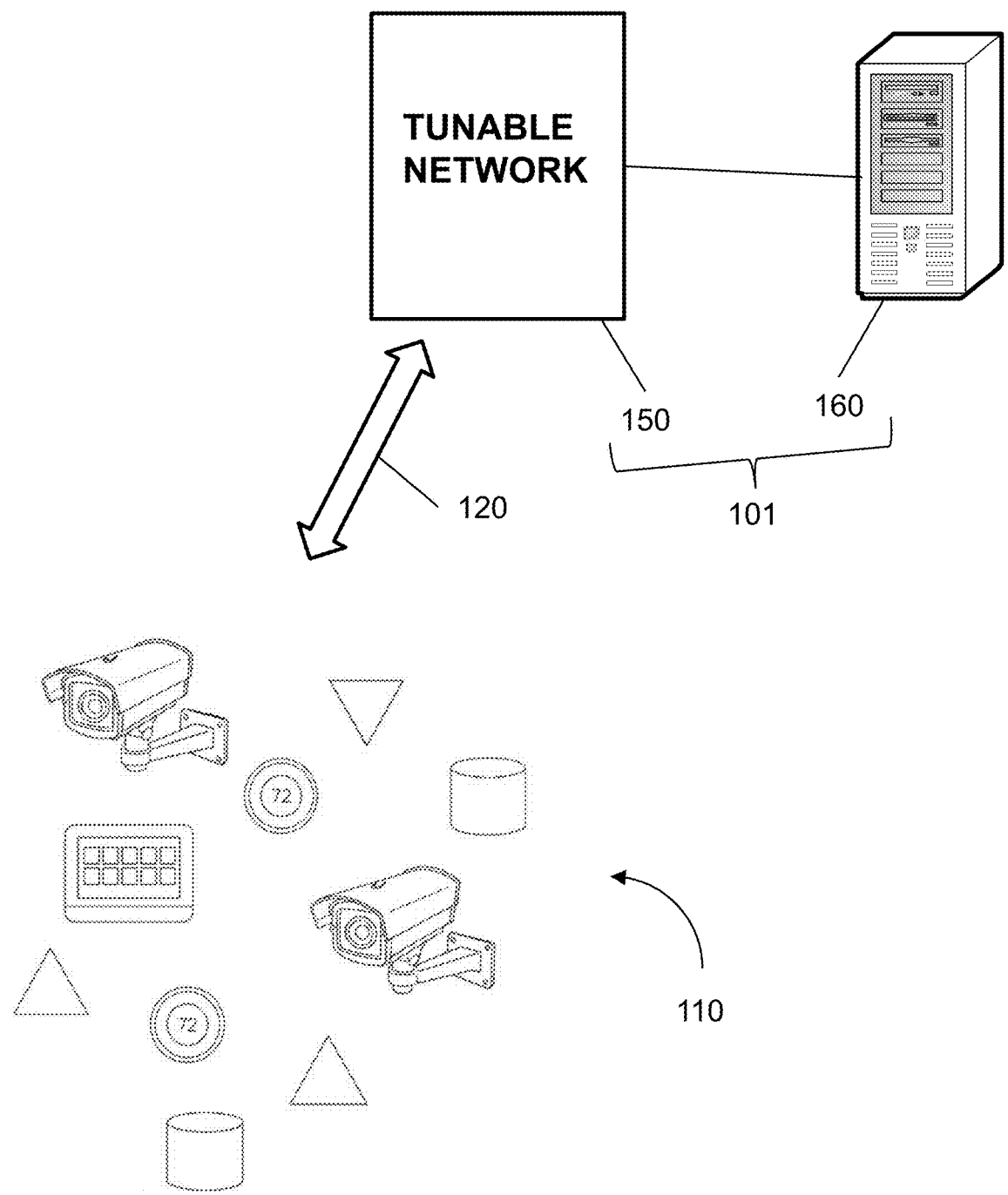
FIG. 1 schematically illustrates IOT devices connecting to a tunable network, according to an embodiment of the disclosure.

The subject disclosure describes, among other things, illustrative embodiments for a communication network connected to multiple diverse devices that require different network services and whose requirements also change with time, and a method for configuring the network to meet those requirements. The network services can be dynamically adjusted for each end-user device to provide the required services at minimum cost. The exemplary embodiments described herein are related to methods and/or systems described in U.S. application Ser. No. 14/515,004 (U.S. Patent Application Publication No. 2016/0113025), the disclosure of which is hereby incorporated by reference. Other embodiments are described in the subject disclosure.

One or more aspects of the subject disclosure include a method comprising providing, by a processing system including a processor, communications services over a network to a user device; obtaining information regarding capabilities of the user device; and obtaining information regarding a usage profile of the user device. The usage profile can include a periodic time interval during which the user device is in an active state; the user device is in an inactive state at other times. The method can also comprise adjusting a level of service quality provided to the user device, in accordance with at least one of the capabilities and the usage profile. The adjusting can be performed by at least one of adjusting a latency criterion regarding connection of the user device to the network; adjusting a speed of transmissions over the network to or from the user device; and altering a routing of transmissions to or from the user device. In this method, the network can be partitioned so that the adjusted level of service quality is provided by a first portion of the network having a predetermined level of network resources. The adjusted level of service quality can comprise a first level while the user device is in the active state and a second level while the user device is in the inactive state; the first level is higher than the second level. The first level and the second level are lower than a level of service quality provided by a second portion of the network.

One or more aspects of the subject disclosure include a device comprising a processing system including a processor and a memory that stores executable instructions. The instructions, when executed by the processing system, facilitate performance of operations. The operations can comprise providing communications services over a network to a user device; obtaining information regarding capabilities of the user device; and obtaining information regarding a usage profile of the user device. The usage profile can include a periodic time interval during which the user device is in an active state; the user device is in an inactive state at other times. The operations can also comprise adjusting a level of service quality provided to the user device, in accordance with at least one of the capabilities and the usage profile. The level of service quality can be adjusted by performing at least one of adjusting a latency criterion regarding connection of the user device to the network, adjusting a permitted number of transmissions from the user device per unit time, and altering a routing of transmissions to or from the user device. The network can be partitioned so that the adjusted level of service quality is provided by a first portion of the network having a predetermined level of network resources; the adjusted level of service quality can comprise a first level while the user device is in the active state and a second level while the user device is in the inactive state; the first level is higher than the second level. The first level and the second level are lower than a level of service quality provided by a second portion of the network.

One or more aspects of the subject disclosure include a machine-readable storage medium comprising executable instructions that, when executed by a processing system including a processor, facilitate performance of operations. The operations can comprise providing communications services over a network to a user device; obtaining information regarding capabilities of the user device; and obtaining information regarding a usage profile of the user device. The usage profile can include a periodic time interval during which the user device is in an active state; the user device is in an inactive state at other times. The operations can also comprise adjusting a level of service quality provided to the user device, in accordance with at least one of the capabilities and the usage profile. The level of service quality can be adjusted by performing at least one of adjusting a latency criterion regarding connection of the user device to the network; adjusting an assigned ratio of uplink to downlink transmissions performed by the user device; and altering a routing of transmissions to or from the user device. The network can be partitioned so that the adjusted level of service quality is provided by a first portion of the network having a predetermined level of network resources; the adjusted level of service quality can comprise a first level while the user device is in the active state and a second level while the user device is in the inactive state; the first level is higher than the second level. The first level and the second level are lower than a level of service quality provided by a second portion of the network.

FIG. 1 schematically illustrates an arrangement 100 in which IOT devices connect to a tunable network, according to an embodiment of the disclosure. As shown in FIG. 1, the IOT devices 110 can include cameras, temperature sensors, humidity sensors, motion sensors, gas/vapor detectors, etc. In general, IOT devices transmit data representing some aspect of their immediate environment; in normal operation they might or might not interact with a user. In this embodiment, a set of different IOT devices communicate over various data paths (shown for simplicity as one wireless path 120) with a tunable network 150. Network 150 may be configured to provide each IOT device with communication services appropriate to capability and usage profiles of the device, as detailed below.

In an embodiment, network 150 is coupled to a server 160 that can manage the network to reduce cost (for example, limiting or delaying transmissions to the IOT devices during times of network congestion). The combination of network 150 and server 160 may be viewed as a processing system 101 that is aware of IOT devices connected to the network, and can configure network connections dynamically and/or on demand to provide services to the IOT devices. In an embodiment, server 160 can cause the network 150 to provide more or fewer resources to an IOT device or a group of IOT devices to meet specific customer needs. In an embodiment, the system can comprise a home subscriber server (HSS). In general, network 150 can be configured dynamically to direct traffic to, and receive traffic from, IOT devices while controlling the cost of provisioning and serving the devices.

In an embodiment, network 150 is continuously monitored in order to assess its available capacity to serve one or more of the IOT devices 110. In general, the cost of serving the IOT devices is lower during periods of relatively lower utilization (that is, periods of relatively higher available capacity).

Figure 2:
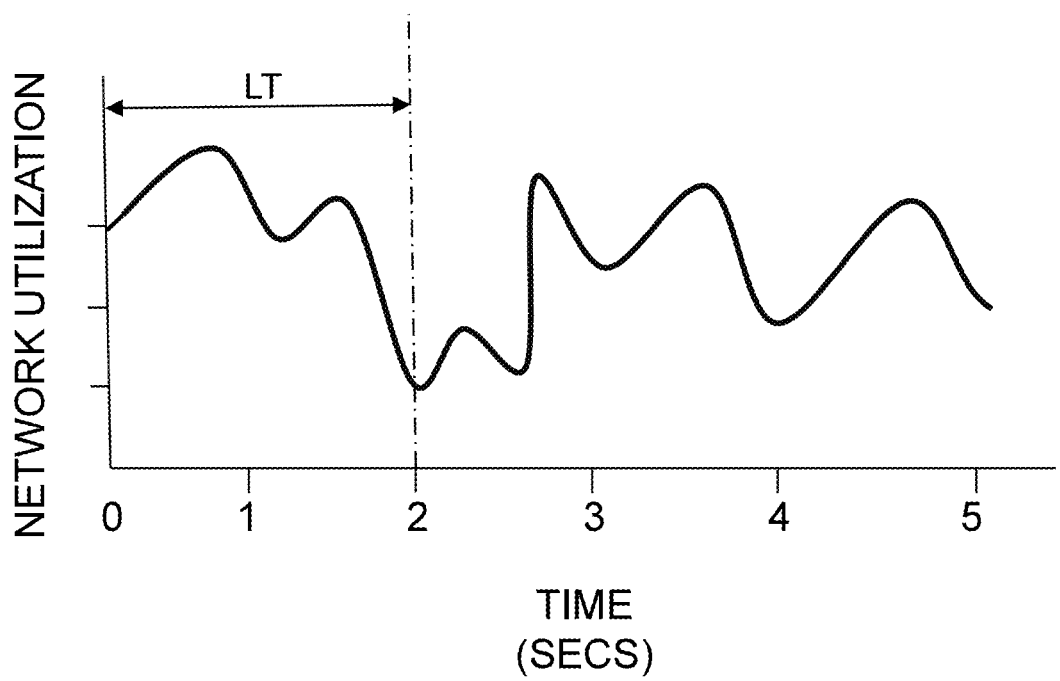
FIG. 2 depicts network utilization in a case where a device with allowable latency connects to the network of FIG. 1.

FIG. 2 depicts a graph 200 showing how network utilization can vary with time, in accordance with an embodiment of the disclosure. In an embodiment, the relative cost of operating an IOT device corresponds to the latency tolerance of that device. For example, as shown in FIG. 2, a device might attempt to connect to the network to transmit traffic at time t=0, when network utilization is relatively high. If the device has a latency tolerance of (for example) 0.5 sec or less, the network may require additional resources to respond to the device. Handling traffic from the device in this situation will therefore be relatively costly.

If the device can tolerate greater latency (that is, the system can delay responding to the device), traffic from the device can be handled at reduced cost. For example, as shown in FIG. 2, if the device attempts a connection at t=0 but has a latency tolerance LT of 2 sec, the system can delay its response until t=2 sec when network utilization is approximately one-third of that at t=0. In an embodiment, network 150 offers connections for latency-tolerant devices so that the system can prioritize other traffic and process the IOT's traffic at times of reduced congestion.

In an embodiment, the system handles traffic to and from IOT devices during periods of reduced network utilization. If a device attempts to access the network while the network is congested, the system can retrieve historical data for network utilization, predict a future time of relatively low utilization, and transmit a signal to the device suggesting a time when the device should retry connecting.

In an embodiment, the network includes base stations for handling wireless communications to and from the IOT devices; the base stations include computing devices to monitor traffic to and from the IOT devices. In this embodiment, a base station can predict a future time interval having reduced network utilization and delay communications with a device, subject to the device's latency tolerance.

Figure 3:
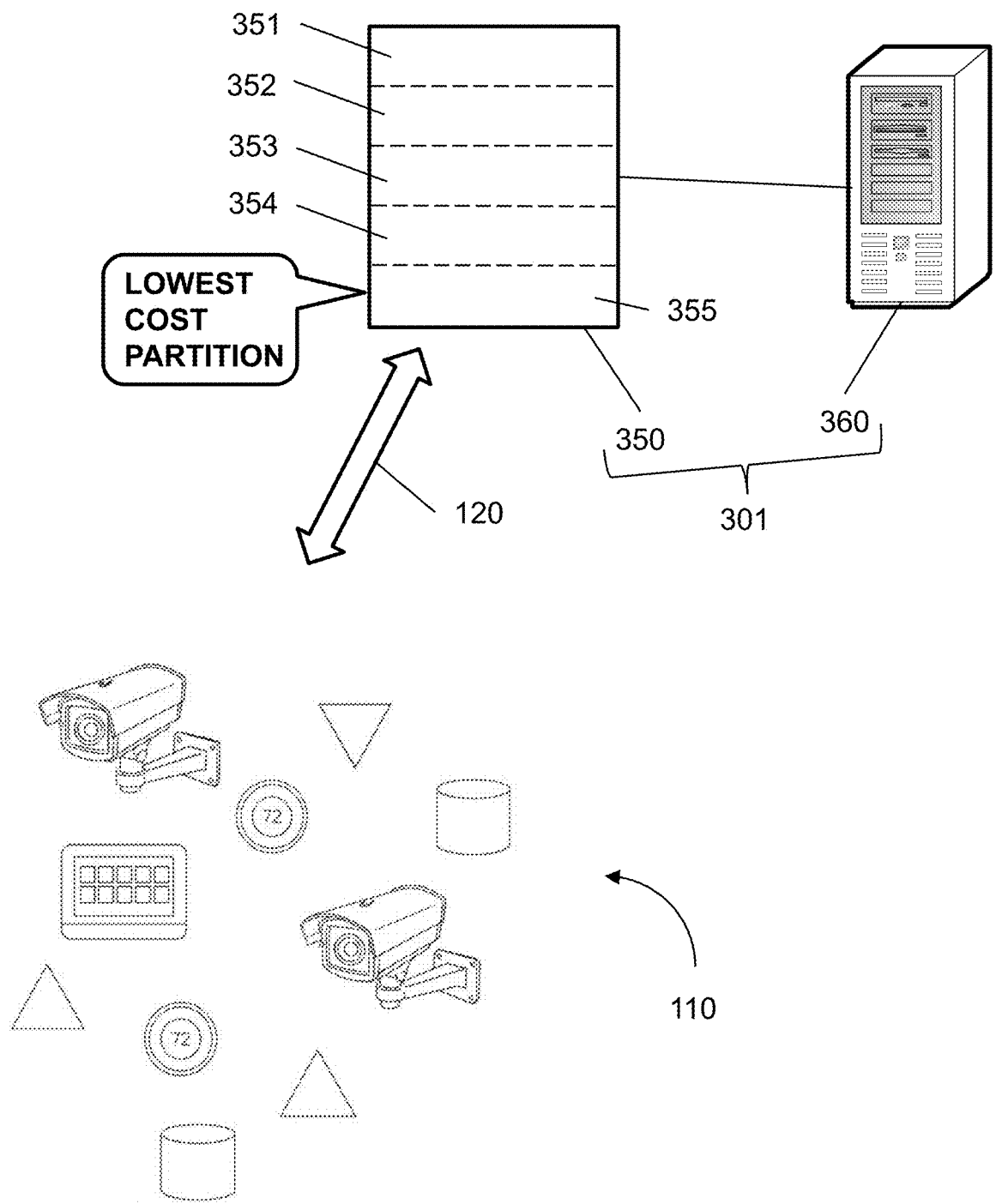
FIG. 3 schematically illustrates IOT devices connecting to a partitioned network, according to an embodiment of the disclosure.

FIG. 3 schematically illustrates an arrangement 300 in which IOT devices connect to a partitioned network, according to an embodiment of the disclosure. As shown in FIG. 3, system 301 includes a partitioned network 350 and server 360. The partitions 351-355 of network 350 include a low-cost partition 355 having fewer resources than partitions 351-354. In an embodiment, IOT devices having a higher tolerance for delay can be assigned to connect with nodes in the low-cost partition 355. In another embodiment, partitioning of network 350 is performed dynamically as IOT devices are added or removed, so that each IOT device is provisioned with appropriate resources and can thus operate at a reduced cost. In another embodiment, a partition other than the low-cost partition may be selected for connecting to the IOT devices (or a selected set of the IOT devices), so that a desired quality of service level is provided.

Figure 4:
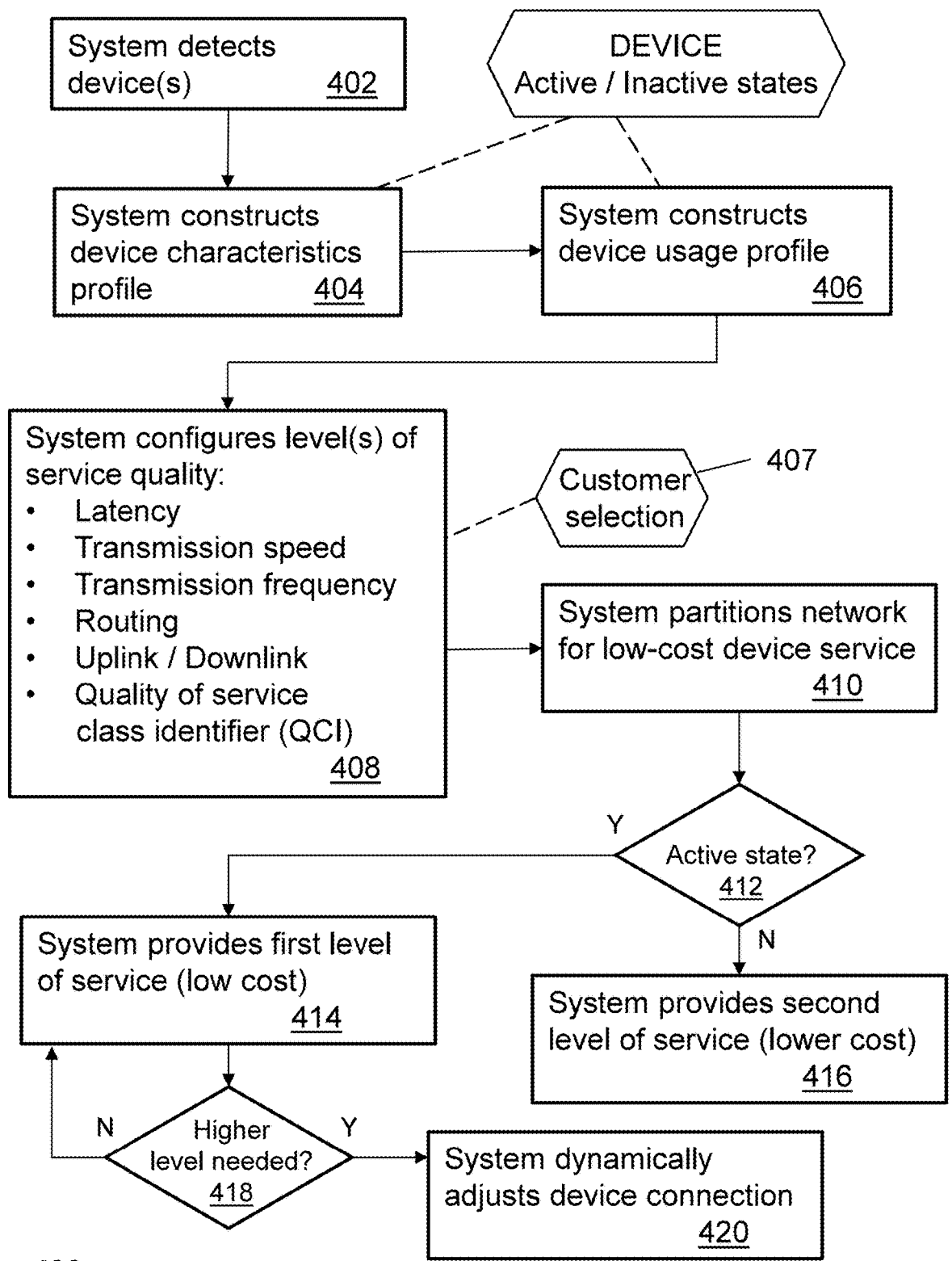
FIG. 4 shows a flowchart illustrating a method for configuring a tunable network to provide services to IOT devices, according to an embodiment of the disclosure.

FIG. 4 depicts an illustrative embodiment of a method 400 for configuring a tunable network to provide services to IOT devices. In this embodiment, one or more IOT devices, belonging to a customer subscribing to the network, transmit data over the network. In step 402, a system (for example, processing system 301) detects an IOT device connected on the network. The system then discovers characteristics and capabilities of the IOT device, and builds a profile for the device (step 404). In an embodiment, a data transmission from the device includes an identifier for the device, which permits the system to determine the device characteristics. For example, the device may be characterized by a latency tolerance which is indexed to the identifier and stored in a database; the database can be remote from the server 360 and accessible via the network 350. The system also builds a usage profile for the device (step 406), based on historical network traffic data. In an embodiment, the device transmits data only periodically; the device thus is in an active state for relatively brief, recurring periods of time, and is in an inactive state at other times.

The system then configures the network (step 408) to provide a level of service quality to the device that best matches the device profiles and the customer's cost preferences. For example, the system can specify an allowable delay for handling traffic from the device in accordance with a latency tolerance of the device, as shown in FIG. 2. The system can also prescribe a maximum speed for data transmissions to or from the device. In an embodiment, the system provisions the device to use a particular access point name (APN) which has a restriction on speed, allows a certain latency, etc. The system can also limit the device to a certain number of transmissions per unit time. In an embodiment, this limitation itself changes with time, in accordance with an expected state (active/inactive) of the device.

The system can also establish a routing for the device so that traffic to or from the device is routed to a network node (or other part of the system) designed to accommodate a relatively large number of devices processing relatively few transactions. (In an embodiment, this is done by partitioning the network to identify nodes with relatively low performance per device that can connect to a relatively large number of devices.) In a particular embodiment, the device is routed to an HSS node with greater latency tolerance than other nodes. In a further embodiment, the system (functioning as a service provider) dynamically downgrades the level of service in order to reach a cost level previously set by the customer.

The system can also assign or restrict a ratio of uplink transmissions to downlink transmissions performed by the device. In an embodiment, the IOT device traffic is primarily uplink (for example, the IOT device is a sensor that typically sends sensory data and only occasionally receives control data). The system then can recognize that such a device can use spare uplink capacity, which can sometimes be available at reduced cost.

In an embodiment, the system can provision the IOT device to receive network services according to a specific quality of service class identifier (QCI). The system can also be configured according to selections 407 transmitted from customer equipment; the service level for the IOT device (or a set of devices of the customer) can thus be changed on demand.

In an embodiment, the system monitors network utilization and thus is aware of when the network has spare capacity for handling IOT device traffic. In this embodiment, the system can enable IOT device transmissions only when there is a certain level of excess capacity available.

The system then partitions the network (step 410) so that IOT devices are connected to a portion of the network that delivers a level of service (with a cost of service) appropriate to the characteristics and usage of the devices. In an embodiment, the appropriate level of service for a device depends on whether the device is in an active or inactive state (for example, depending on whether periodic transmission of data is occurring or expected to occur).

If the IOT device is determined to be in an active state (step 412), the system provides a level of service according to the network configuration; in an embodiment, this corresponds to a first level of service provided by the low-cost partition of the network (step 414) and is a lower level of service than provided by other portions of the network. If the IOT device is determined to be in the inactive state, a second level of service lower than the first level is provided (step 416).

If the system determines (step 418) that a higher level of service is needed, the device connection can be re-routed to a network node with higher performance (step 420). For example, the system can provision an IOT device with a performance upgrade, temporarily requiring a higher level of service to the device. In this embodiment, the system can re-assign the device to a different node for accessing the network or to a different network partition, to ensure that the upgrade is performed efficiently. In another embodiment, the customer can select a new network configuration so that the IOT devices can handle an increased volume of traffic.

Figure 5:
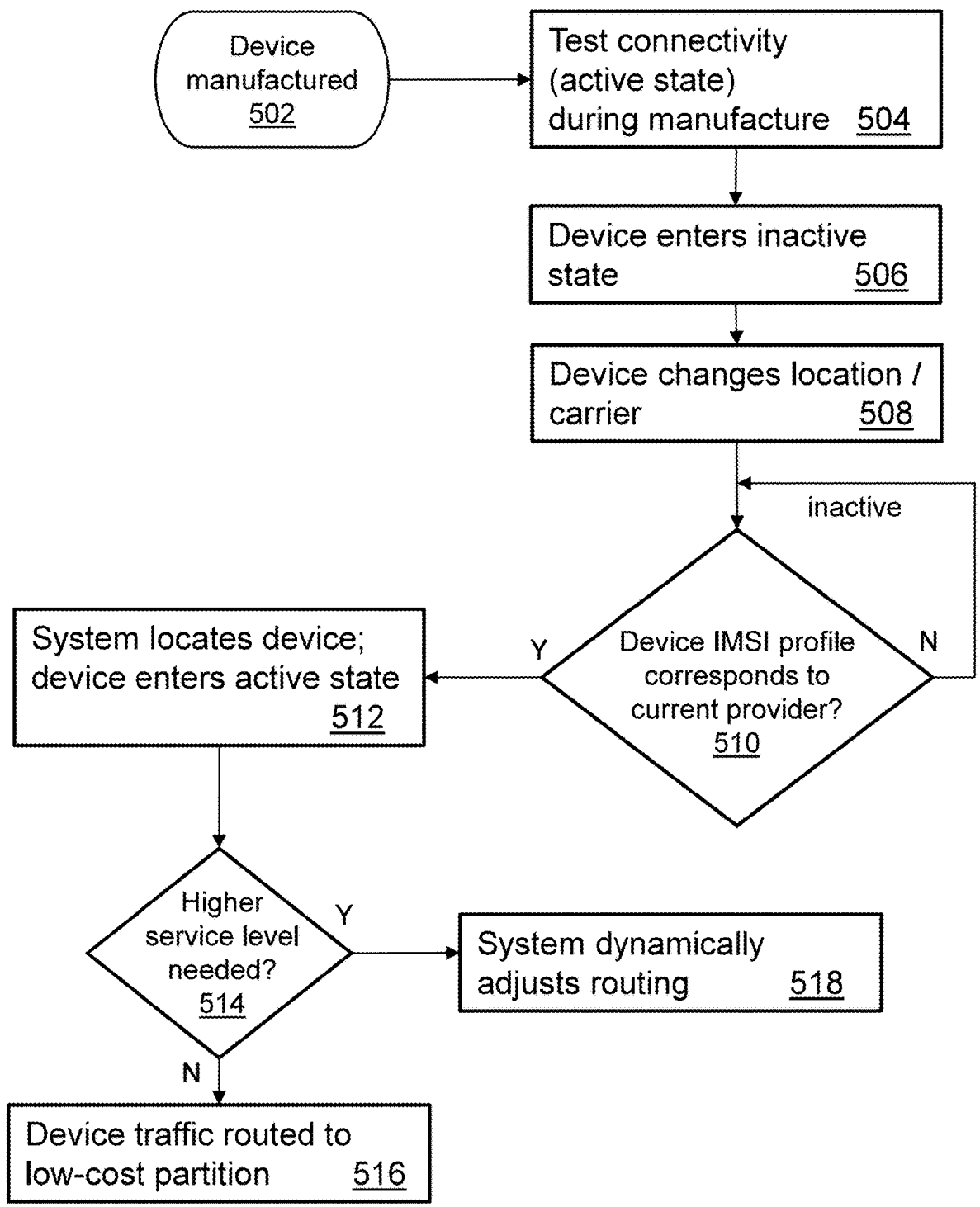
FIG. 5 shows a flowchart illustrating a procedure in which a device is in active and inactive states over a period of time, according to an embodiment of the disclosure.

FIG. 5 shows a flowchart illustrating a procedure 500 in which an IOT device is in active and inactive states over a period of time, according to an embodiment of the disclosure. In this embodiment, it is desired to test the connectivity of the device (step 502) when it is manufactured or is installed in a larger device (for example, a diagnostic sensor being installed in an automobile). The connectivity of the device is thus tested during the manufacturing process (step 504), but can then become dormant while moving through the supply chain (step 506). In this embodiment, a substantial length of time (>1 year) can elapse while the device remains in an inactive state, and the cost to support the device is relatively low throughout this period of time. For example, the device can be included in customer equipment (such as an automobile) and be provisioned with an international mobile subscriber identity (IMSI) profile that does not correspond to the location of the device and/or the data carrier used by the customer. However, when the device roams into the carrier's coverage area or the customer changes the carrier contract (steps 508-510), the device can enter its active state (step 512). In an embodiment, the system locates the device and builds or updates the device's characteristic and usage profiles. In another embodiment, the device includes a storage medium with an identifier and profiles for the device, so that it can connect with the low-cost partition of the network and begin to transmit sensor data. In another embodiment, an IOT device included in new equipment transitions from its inactive state to its active state when that equipment is put into use for the first time, independent of location or movement of the equipment.

If the device does not require a higher level of service (step 514), the device connects (or remains connected) to the low-cost partition of the network (step 516). In an embodiment, the system establishes a low-cost network partition that serves as a default access point for all IOT devices (which in this embodiment can be defined as devices with a specified maximum volume of data per transmission and/or a specified maximum number of transmissions per unit time). If the device requires a higher level of service (for example, an update for the device was prescribed while the device was in its inactive state), the system can dynamically adjust the routing of the device to a different node or a different partition of the network (step 518).

While for purposes of simplicity of explanation, the respective processes are shown and described as a series of blocks in FIGS. 4-5, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 6:
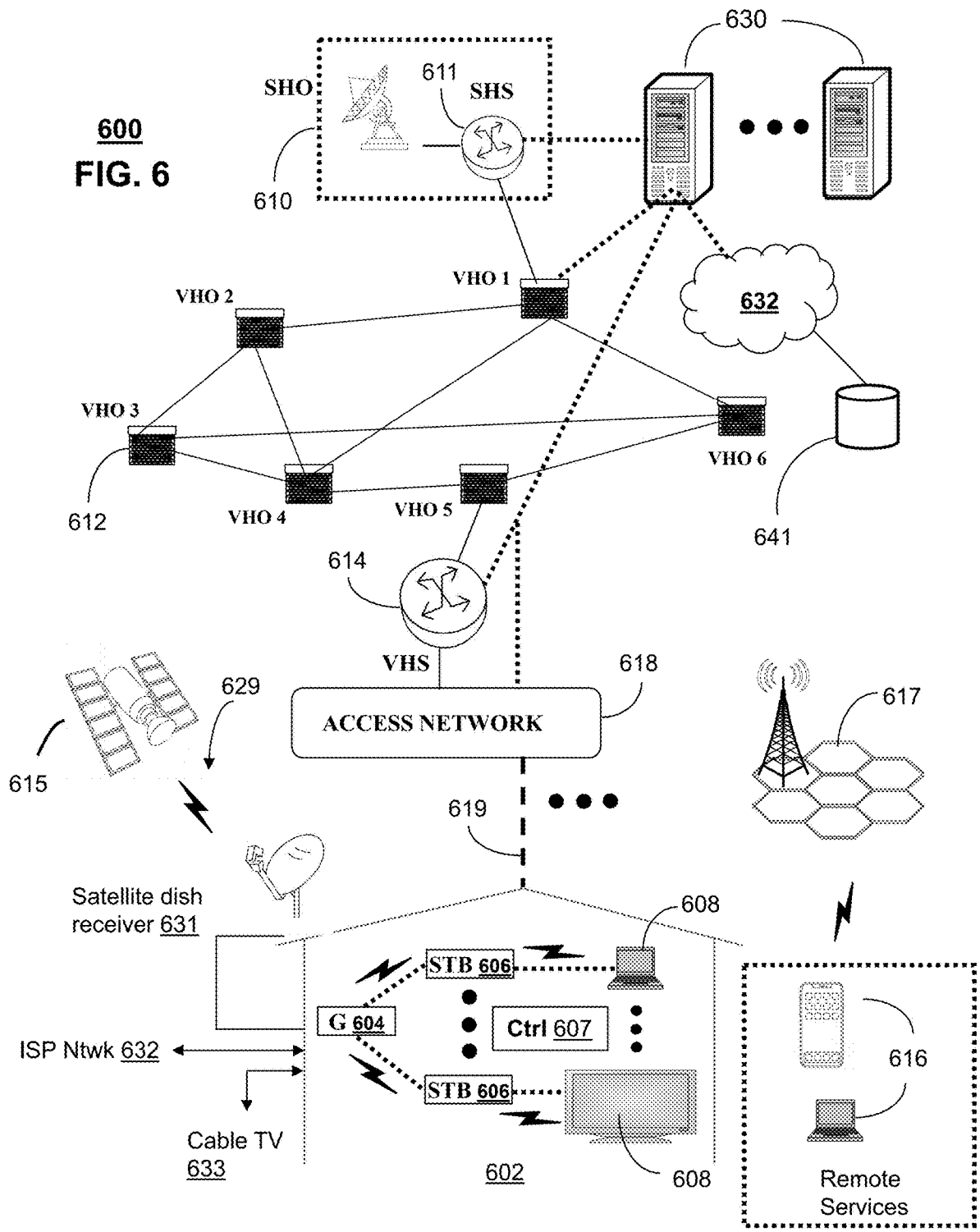
FIGS. 6-7 depict illustrative embodiments of communication systems that provide media services using the networks of FIGS. 1-3.

FIG. 6 depicts an illustrative embodiment of a first communication system 600 for delivering media content. Communication system 600 can be overlaid or operably coupled with system 100 of FIG. 1 and/or system 300 of FIG. 3 as another representative embodiment of communication system 600. For instance, one or both of networks 618, 632 shown in FIG. 6 can be tunable as described above, and thus function as a tunable network 150, 350. In particular embodiments, one or more devices illustrated in the communication system 600 of FIG. 6 can comprise a processing system that facilitates performance of operations;

the operations can comprise providing communications services over a network to a user device; obtaining information regarding capabilities of the user device; and obtaining information regarding a usage profile of the user device. The usage profile can include a periodic time interval during which the user device is in an active state; the user device is in an inactive state at other times. The operations can also comprise adjusting a level of service quality provided to the user device, in accordance with at least one of the capabilities and the usage profile. The level of service quality can be adjusted by performing at least one of adjusting a latency criterion regarding connection of the user device to the network, adjusting a permitted number of transmissions from the user device per unit time, and altering a routing of transmissions to or from the user device. The network can be partitioned so that the adjusted level of service quality is provided by a first portion of the network having a predetermined level of network resources; the adjusted level of service quality can comprise a first level while the user device is in the active state and a second level while the user device is in the inactive state; the first level is higher than the second level. The first level and the second level are lower than a level of service quality provided by a second portion of the network.

The communication system 600 can represent an Internet Protocol Television (IPTV) media system that can include a super head-end office (SHO) 610 with at least one super headend office server (SHS) 611 which receives media content from satellite and/or terrestrial communication systems. In the present context, media content can represent, for example, audio content, moving image content such as 2D or 3D videos, video games, virtual reality content, still image content, and combinations thereof. The SHS server 611 can forward packets associated with the media content to one or more video head-end servers (VHS) 614 via a network of video head-end offices (VHO) 612 according to a multicast communication protocol.

The VHS 614 can distribute multimedia broadcast content via an access network 618 to commercial and/or residential buildings 602 housing a gateway 604 (such as a residential or commercial gateway). The access network 618 can represent a group of digital subscriber line access multiplexers (DSLAMs) located in a central office or a service area interface that provide broadband services over fiber optical links or copper twisted pairs 619 to buildings 602. The gateway 604 can use communication technology to distribute broadcast signals to media processors 606 such as Set-Top Boxes (STBs) which in turn present broadcast channels to media devices 608 such as computers or television sets managed in some instances by a media controller 607 (such as an infrared or RF remote controller). In an embodiment, a device communicating with gateway 604 (for example, media device 608) can function as an IOT device as described above.

The gateway 604, the media processors 606, and media devices 608 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 606 and subsystems of the IPTV media system for services such as video-on-demand (VoD), browsing an electronic programming guide (EPG), or other infrastructure services.

A satellite broadcast television system 629 can be used in the media system of FIG. 6. The satellite broadcast television system can be overlaid, operably coupled with, or replace the IPTV system as another representative embodiment of communication system 600. In this embodiment, signals transmitted by a satellite 615 that include media content can be received by a satellite dish receiver 631 coupled to the building 602. Modulated signals received by the satellite dish receiver 631 can be transferred to the media processors 606 for demodulating, decoding, encoding, and/or distributing broadcast channels to the media devices 608. The media processors 606 can be equipped with a broadband port to a network 632 to enable interactive services such as VoD and EPG as described above.

In yet another embodiment, an analog or digital cable broadcast distribution system such as cable TV system 633 can be overlaid, operably coupled with, or replace the IPTV system and/or the satellite TV system as another representative embodiment of communication system 600. In this embodiment, the cable TV system 633 can also provide Internet, telephony, and interactive media services. It will be appreciated that system 600 can enable various types of IOT devices, as well as interactive television devices and/or services including IPTV, cable and/or satellite.

The subject disclosure can apply to other present or next generation over-the-air and/or landline media content services system.

Some of the network elements of the IPTV media system can be coupled to one or more computing devices 630, a portion of which can operate as a web server for providing web portal services over the ISP network 632 to wireline media devices 608 or wireless communication devices 616. In particular, computing device 630 can communicate with, and provide services to, IOT device 641 via network 632.

Communication system 600 can also provide for all or a portion of the computing devices 630 to function as a server communicatively coupled to networks 150 or 350, or as a network manager for networks 150 or 350 (herein referred to as server 630). The server 630 can use computing and communication technology to provision IOT devices, which can include among other things, the techniques described in methods 400-500 of FIGS. 4-5. For instance, device routing performed by server 630 can be similar to routing by servers 160 and 360 of FIGS. 1 and 3 in accordance with methods 400 and 500. The media processors 606 and wireless communication devices 616 can be provisioned with software functions to utilize the services of server 630. For instance, media processors 606 and wireless communication devices 616 can be used to transmit customer selections 407 to system 301.

Multiple forms of media services can be offered to media devices over landline technologies such as those described above. Additionally, media services can be offered to media devices by way of a wireless access base station 617 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 7:
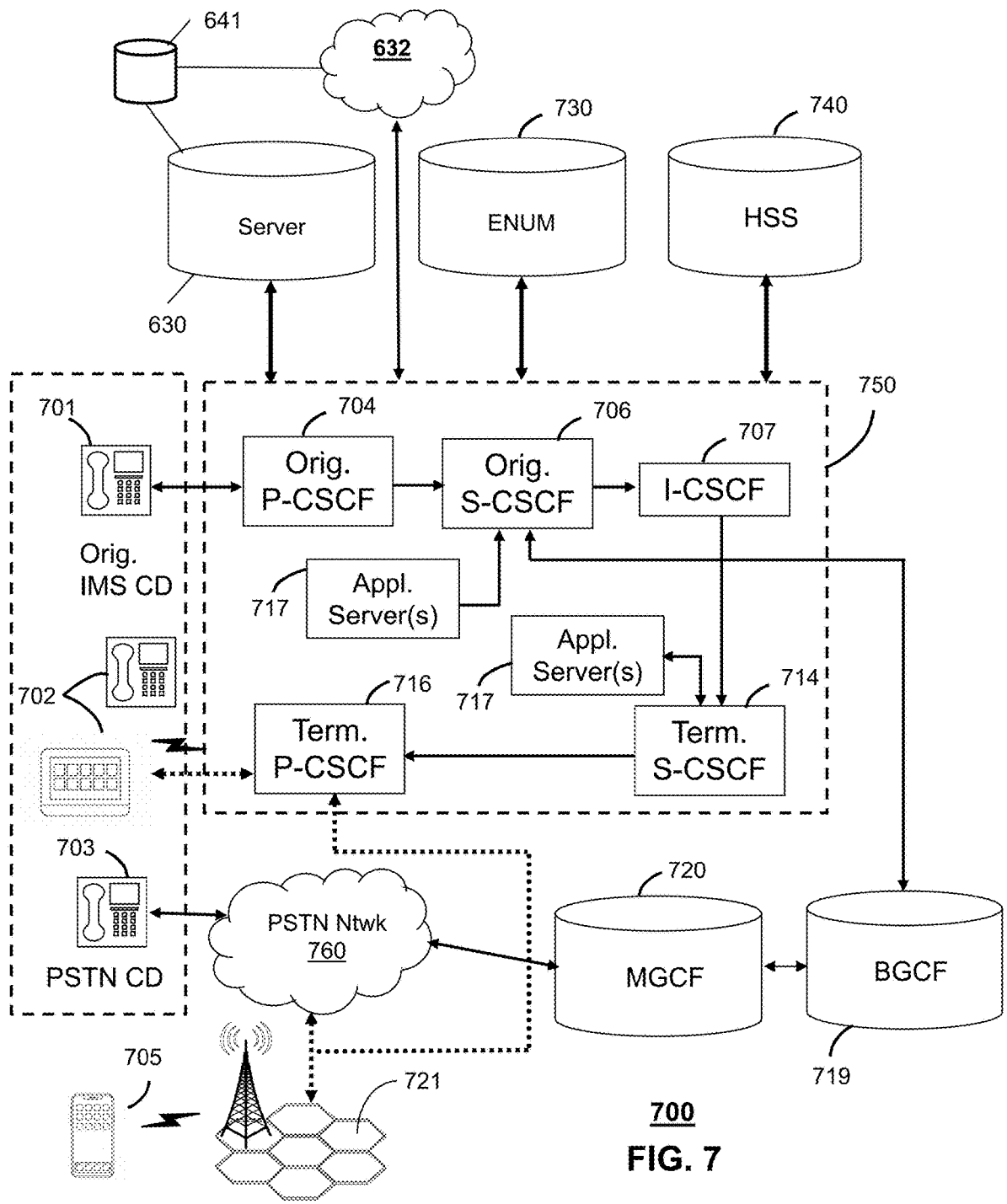

FIG. 7 depicts an illustrative embodiment of a communication system 700 employing an IP Multimedia Subsystem (IMS) network architecture to facilitate the combined services of circuit-switched and packet-switched systems. Communication system 700 can be overlaid or operably coupled with system 100 of FIG. 1 and/or system 300 of FIG. 3 and communication system 600 as another representative embodiment of communication system 600. In particular, server 630 (also shown in FIG. 6) can communicate with IOT device 641 either directly or via network 632; in the embodiment shown in FIG. 7, server 630 communicates with network 632 via IMS network 750, which itself may be a tunable network as described above. Accordingly, elements of system 700 can perform a method comprising providing, by a processing system including a processor, communications services over a network to a user device; obtaining information regarding capabilities of the user device; and obtaining information regarding a usage profile of the user device. The usage profile can include a periodic time interval during which the user device is in an active state; the user device is in an inactive state at other times. The method can also comprise adjusting a level of service quality provided to the user device, in accordance with at least one of the capabilities and the usage profile. The adjusting can be performed by at least one of adjusting a latency criterion regarding connection of the user device to the network; adjusting a speed of transmissions over the network to or from the user device; and altering a routing of transmissions to or from the user device. In this method, the network can be partitioned so that the adjusted level of service quality is provided by a first portion of the network having a predetermined level of network resources. The adjusted level of service quality can comprise a first level while the user device is in the active state and a second level while the user device is in the inactive state; the first level is higher than the second level. The first level and the second level are lower than a level of service quality provided by a second portion of the network.

Communication system 700 can comprise a Home Subscriber Server (HSS) 740, a tElephone NUmber Mapping (ENUM) server 730, and other network elements of an IMS network 750. The IMS network 750 can establish communications between IMS-compliant communication devices (CDs) 701, 702, Public Switched Telephone Network (PSTN) CDs 703, 705, and combinations thereof by way of a Media Gateway Control Function (MGCF) 720 coupled to a PSTN network 760. The MGCF 720 need not be used when a communication session involves IMS CD to IMS CD communications. A communication session involving at least one PSTN CD may utilize the MGCF 720.

IMS CDs 701, 702 can register with the IMS network 750 by contacting a Proxy Call Session Control Function (P-CSCF) which communicates with an interrogating CSCF (I-CSCF), which in turn, communicates with a Serving CSCF (S-CSCF) to register the CDs with the HSS 740. To initiate a communication session between CDs, an originating IMS CD 701 can submit a Session Initiation Protocol (SIP INVITE) message to an originating P-CSCF 704 which communicates with a corresponding originating S-CSCF 706. The originating S-CSCF 706 can submit the SIP INVITE message to one or more application servers (ASs) 717 that can provide a variety of services to IMS subscribers.

For example, the application servers 717 can be used to perform originating call feature treatment functions on the calling party number received by the originating S-CSCF 706 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 706 can submit queries to the ENUM system 730 to translate an E.164 telephone number in the SIP INVITE message to a SIP Uniform Resource Identifier (URI) if the terminating communication device is IMS-compliant. The SIP URI can be used by an Interrogating CSCF (I-CSCF) 707 to submit a query to the HSS 740 to identify a terminating S-CSCF 714 associated with a terminating IMS CD such as reference 702. Once identified, the I-CSCF 707 can submit the SIP INVITE message to the terminating S-CSCF 714. The terminating S-CSCF 714 can then identify a terminating P-CSCF 716 associated with the terminating CD 702. The P-CSCF 716 may then signal the CD 702 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 7 may be interchangeable. It is further noted that communication system 700 can be adapted to support video conferencing. In addition, communication system 700 can be adapted to provide the IMS CDs 701, 702 with the multimedia and Internet services of communication system 600 of FIG. 6.

If the terminating communication device is instead a PSTN CD such as CD 703 or CD 705 (in instances where the cellular phone only supports circuit-switched voice communications), the ENUM system 730 can respond with an unsuccessful address resolution which can cause the originating S-CSCF 706 to forward the call to the MGCF 720 via a Breakout Gateway Control Function (BGCF) 719. The MGCF 720 can then initiate the call to the terminating PSTN CD over the PSTN network 760 to enable the calling and called parties to engage in voice and/or data communications.

It is further appreciated that the CDs of FIG. 7 can operate as wireline or wireless devices. For example, the CDs of FIG. 7 can be communicatively coupled to a cellular base station 721, a femtocell, a WiFi router, a Digital Enhanced Cordless Telecommunications (DECT) base unit, or another suitable wireless access unit to establish communications with the IMS network 750 of FIG. 7. The cellular access base station 721 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 7.

Cellular phones supporting LTE can support packet-switched voice and packet-switched data communications and thus may operate as IMS-compliant mobile devices. In this embodiment, the cellular base station 721 may communicate directly with the IMS network 750 as shown by the arrow connecting the cellular base station 721 and the P-CSCF 716.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 630 of FIG. 6 can be operably coupled to communication system 700 for purposes similar to those described above. Server 630 can perform device provisioning and data traffic handling services to the CDs 701, 702, 703 and 705 of FIG. 7 similar to the functions described for servers 160 and 360 of FIGS. 1 and 3 in accordance with methods 400-500 of FIGS. 4-5. CDs 701, 702, 703 and 705 can be adapted with software to utilize the services of the server 630. Server 630 can be an integral part of the application server(s) 717, which can be adapted to the operations of the IMS network 750. In an embodiment, network 750 can be a tunable network as described above, while communication devices 701-703 can function as, or include, IOT devices communicating with the tunable network.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 8:
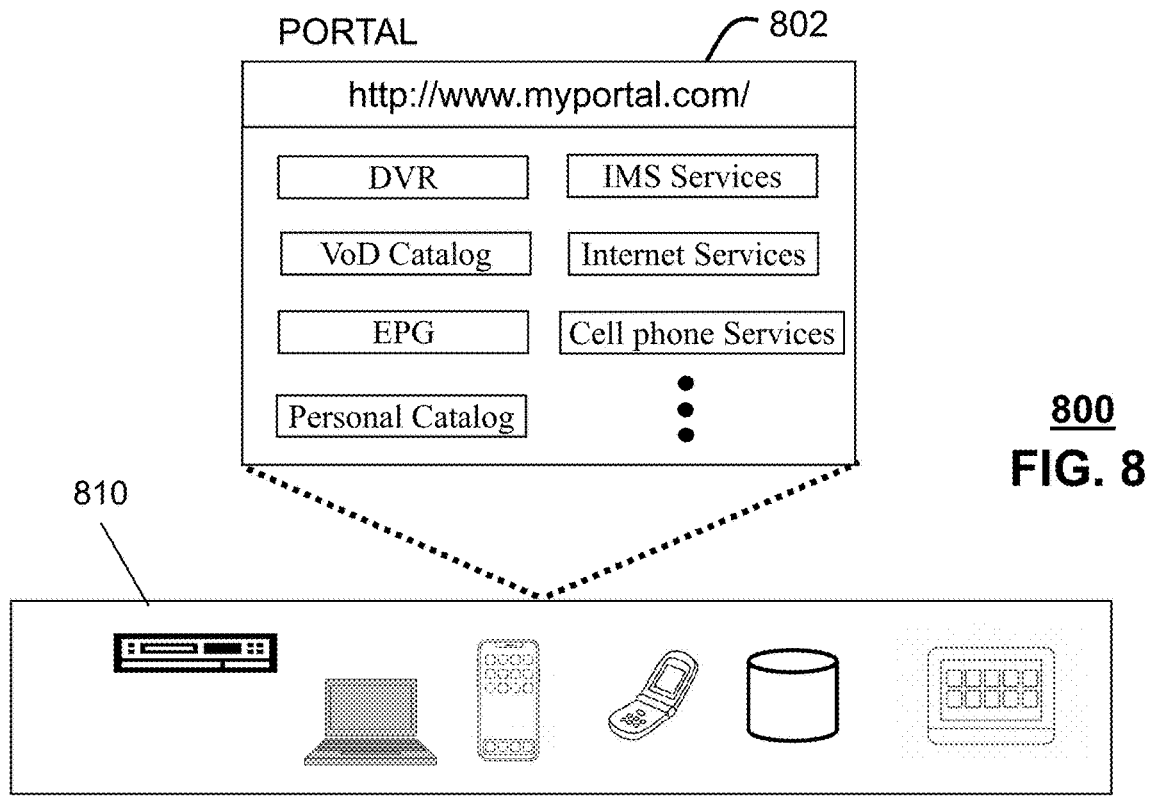
FIG. 8 depicts an illustrative embodiment of a web portal for interacting with communication systems as shown in FIGS. 1 and 3.

FIG. 8 depicts an illustrative embodiment of a web portal 802 of a communication system 800. Communication system 800 can be overlaid or operably coupled with system 100 of FIG. 1 and/or system 300 of FIG. 3, communication system 600, and/or communication system 700 as another representative embodiment of system 100, system 300, communication system 600, and/or communication system 700. For example, web portal 802 can provide access to a variety of devices 810 including communication devices and/or IOT devices. The web portal 802 can thus be used for managing services of system 100 and/or system 300 and communication systems 600-700. A web page of the web portal 802 can be accessed by a Uniform Resource Locator (URL) with an Internet browser using an Internet-capable communication device such as those described in FIGS. 1-3, 6 and 7. In an embodiment, the web portal 802 comprises an enterprise portal that can access IOT devices suitable for a commercial environment (temperature sensors, humidity sensors, etc.) In other embodiments, the web portal 802 can be configured, for example, to access a media processor 606 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 606. The web portal 802 can also be used for provisioning IMS services described earlier, provisioning Internet services, provisioning cellular phone services, and so on.

The web portal 802 can further be utilized to manage and provision software applications in a software defined network (SDN) to adapt these applications as may be desired by subscribers and/or service providers of systems 100 and 300, and communication systems 600-700. For instance, users of the services provided by servers 160, 360 or 630 can log into their on-line accounts and provision the servers 160, 360 or 630 with profiles of IOT devices, provide contact information to the server to enable it to communicate with the devices described in FIGS. 1-5, and so on. Service providers can log onto an administrator account to provision, monitor and/or maintain systems 100 or 300, or server 630.

Figure 9:
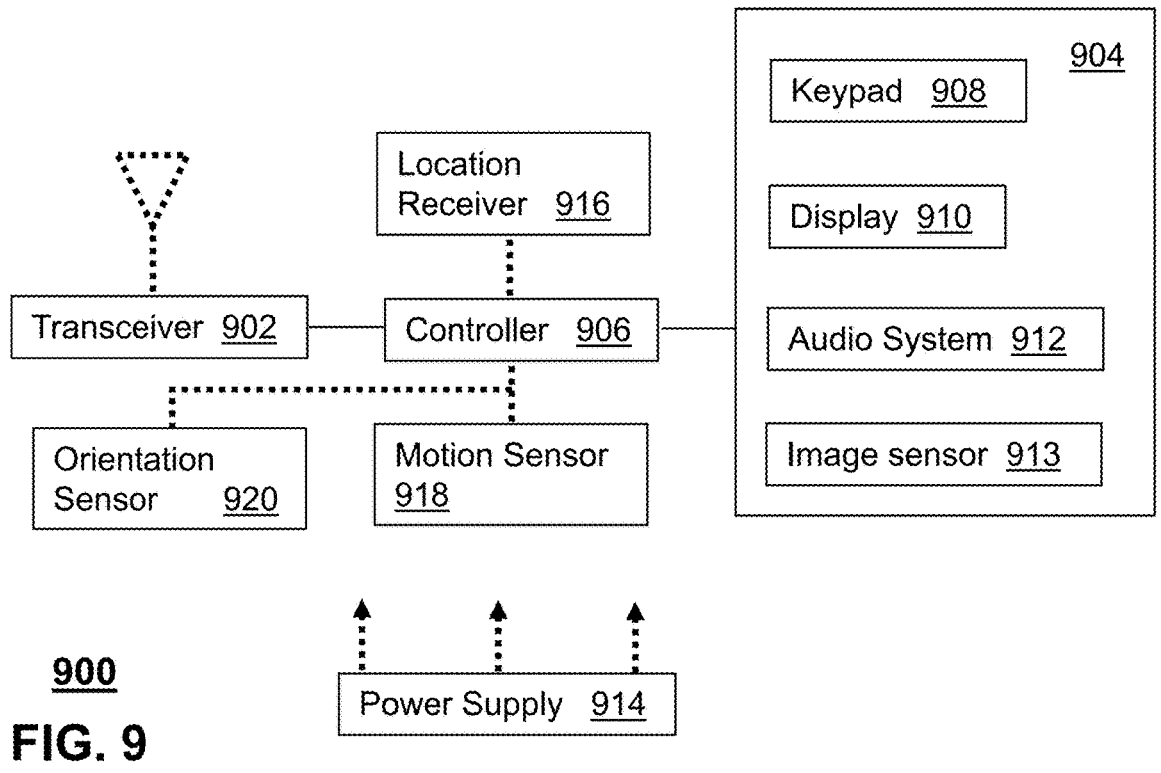
FIG. 9 depicts an illustrative embodiment of a communication device.

FIG. 9 depicts an illustrative embodiment of a communication device 900. Communication device 900 can serve in whole or in part as an illustrative embodiment of the devices depicted in FIGS. 1 and/or 3, and FIGS. 4-5 and can be configured to perform portions of method 400 and/or method 500 of FIGS. 4 and 5. In particular, device 900 can be configured as an IOT device that includes a subset of the components shown in FIG. 9 (for example, a combination of a transceiver, motion sensor, orientation sensor, controller, and power supply). In a specific IOT device, the sensors can instead comprise sensors for one or more of light, sound, temperature, humidity, pressure, etc. For example, an IOT device can include a sensor 918, a controller 906 and a transceiver 902.

Communication device 900 can comprise a wireline and/or wireless transceiver 902 (herein transceiver 902), a user interface (UI) 904, a power supply 914, a location receiver 916, a motion sensor 918, an orientation sensor 920, and a controller 906 for managing operations thereof. The transceiver 902 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 902 can also be adapted to support circuit-switched wireline access technologies (such as PSTN), packet-switched wireline access technologies (such as TCP/IP, VoIP, etc.), and combinations thereof.

The UI 904 can include a depressible or touch-sensitive keypad 908 with a navigation mechanism such as a roller ball, a joystick, a mouse, or a navigation disk for manipulating operations of the communication device 900. The keypad 908 can be an integral part of a housing assembly of the communication device 900 or an independent device operably coupled thereto by a tethered wireline interface (such as a USB cable) or a wireless interface supporting for example Bluetooth®. The keypad 908 can represent a numeric keypad commonly used by phones, and/or a QWERTY keypad with alphanumeric keys. The UI 904 can further include a display 910 such as monochrome or color LCD (Liquid Crystal Display), OLED (Organic Light Emitting Diode) or other suitable display technology for conveying images to an end user of the communication device 900. In an embodiment where the display 910 is touch-sensitive, a portion or all of the keypad 908 can be presented by way of the display 910 with navigation features.

The display 910 can use touch screen technology to also serve as a user interface for detecting user input. As a touch screen display, the communication device 900 can be adapted to present a user interface with graphical user interface (GUI) elements that can be selected by a user with a touch of a finger. The touch screen display 910 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 910 can be an integral part of the housing assembly of the communication device 900 or an independent device communicatively coupled thereto by a tethered wireline interface (such as a cable) or a wireless interface.

The UI 904 can also include an audio system 912 that utilizes audio technology for conveying low volume audio (such as audio heard in proximity of a human ear) and high volume audio (such as speakerphone for hands free operation). The audio system 912 can further include a microphone for receiving audible signals of an end user. The audio system 912 can also be used for voice recognition applications. The UI 904 can further include an image sensor 913 such as a charged coupled device (CCD) camera for capturing still or moving images.

The power supply 914 can utilize common power management technologies such as replaceable and rechargeable batteries, supply regulation technologies, and/or charging system technologies for supplying energy to the components of the communication device 900 to facilitate long-range or short-range portable applications. Alternatively, or in combination, the charging system can utilize external power sources such as DC power supplied over a physical interface such as a USB port or other suitable tethering technologies.

The location receiver 916 can utilize location technology such as a global positioning system (GPS) receiver capable of assisted GPS for identifying a location of the communication device 900 based on signals generated by a constellation of GPS satellites, which can be used for facilitating location services such as navigation. The motion sensor 918 can utilize motion sensing technology such as an accelerometer, a gyroscope, or other suitable motion sensing technology to detect motion of the communication device 900 in three-dimensional space. The orientation sensor 920 can utilize orientation sensing technology such as a magnetometer to detect the orientation of the communication device 900 (north, south, west, and east, as well as combined orientations in degrees, minutes, or other suitable orientation metrics).

The communication device 900 can use the transceiver 902 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 906 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 900.

Other components not shown in FIG. 9 can be used in one or more embodiments of the subject disclosure. For instance, the communication device 900 can include a reset button (not shown). The reset button can be used to reset the controller 906 of the communication device 900. In yet another embodiment, the communication device 900 can also include a factory default setting button positioned, for example, below a small hole in a housing assembly of the communication device 900 to force the communication device 900 to re-establish factory settings. In this embodiment, a user can use a protruding object such as a pen or paper clip tip to reach into the hole and depress the default setting button. The communication device 900 can also include a slot for adding or removing an identity module such as a Subscriber Identity Module (SIM) card. SIM cards can be used for identifying subscriber services, executing programs, storing subscriber data, and so forth.

The communication device 900 as described herein can operate with more or less of the circuit components shown in FIG. 9. These variant embodiments can be used in one or more embodiments of the subject disclosure.

The communication device 900 can be adapted to perform the functions of devices of FIGS. 1 and/or 3, the media processor 606, the media devices 608, or the portable communication devices 616 of FIG. 6, as well as the IMS CDs 701-702 and PSTN CDs 703-705 of FIG. 7. It will be appreciated that the communication device 900 can also represent other devices that can operate in systems 100, 300, and/or communication systems 600-700, such as a gaming console and a media player. In addition, the controller 906 can be adapted in various embodiments to perform network monitoring and provisioning functions.

Upon reviewing the aforementioned embodiments, it would be evident to an artisan with ordinary skill in the art that said embodiments can be modified, reduced, or enhanced without departing from the scope of the claims described below. For example, in cases where IOT devices communicate over the network intermittently (e.g. sending a status report once per day), network services can be made available to such devices at pre-scheduled times, with the time of actual transmission dynamically adjusted to occur when network traffic is reduced and excess capacity is available.

In another embodiment, a system provider communicates with a customer over a software-defined network to enable a communication for the customer's specific needs, which may be unique to that communication. The customer thus can obtain the desired services dynamically, as opposed to the customer using services prescribed by his rate plan. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 10:
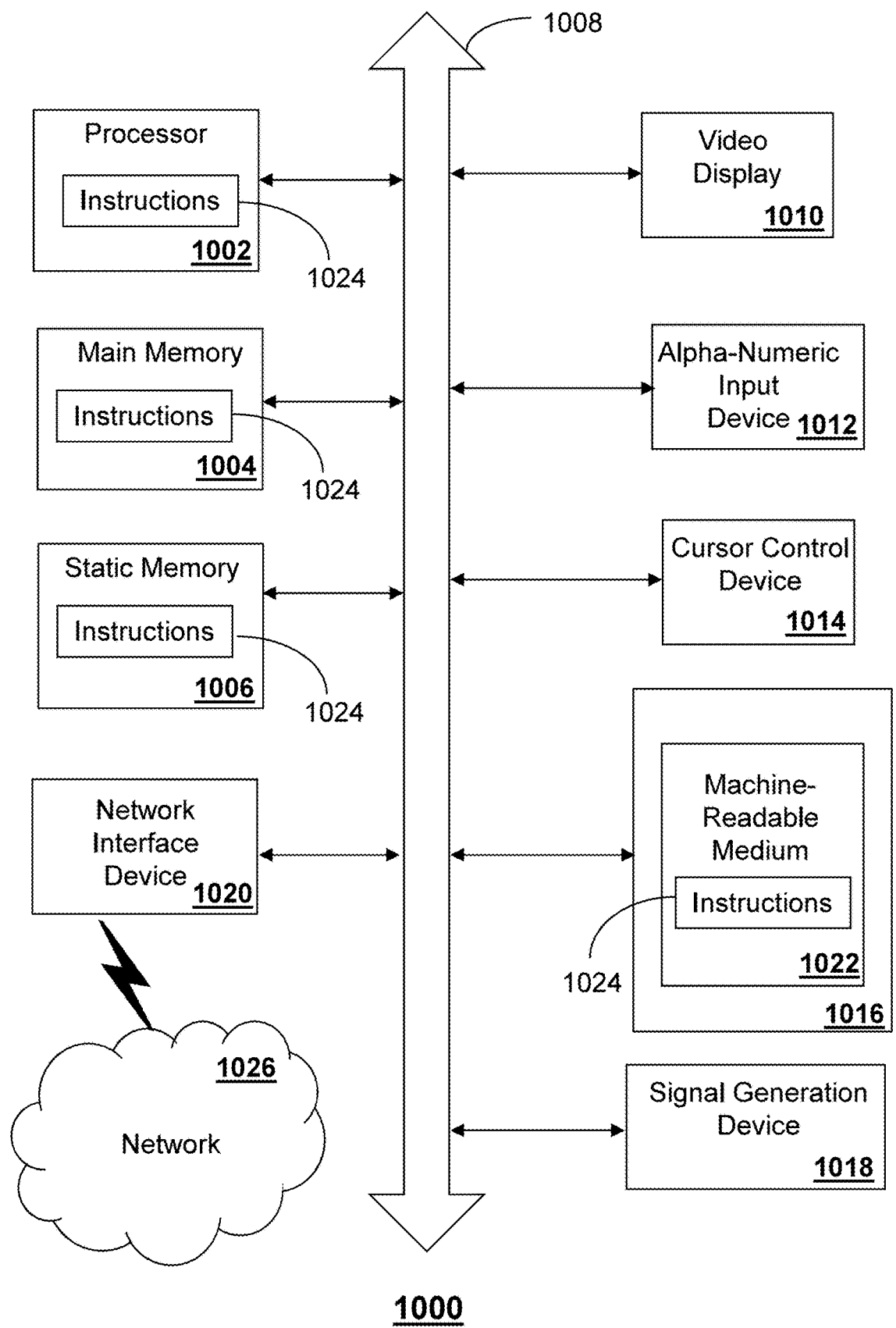
FIG. 10 is a diagrammatic representation of a machine in the form of a computer system within which a set of instructions, when executed, may cause the machine to perform any one or more of the methods described herein.

FIG. 10 depicts an exemplary diagrammatic representation of a machine in the form of a computer system 1000 within which a set of instructions, when executed, may cause the machine to perform any one or more of the methods described above. One or more instances of the machine can operate, for example, as the server 160, the server 360, the server 630, and other devices of FIGS. 1-5. In some embodiments, the machine may be connected (e.g., using a network 1026) to other machines. In particular, network 1026 can be a tunable network as described above, communicating with various IOT devices. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1000 may include a processor (or controller) 1002 (e.g., a central processing unit (CPU)), a graphics processing unit (GPU, or both), a main memory 1004 and a static memory 1006, which communicate with each other via a bus 1008. The computer system 1000 may further include a display unit 1010 (e.g., a liquid crystal display (LCD), a flat panel, or a solid state display). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020. In distributed environments, the embodiments described in the subject disclosure can be adapted to utilize multiple display units 1010 controlled by two or more computer systems 1000. In this configuration, presentations described by the subject disclosure may in part be shown in a first of the display units 1010, while the remaining portion is presented in a second of the display units 1010.

The disk drive unit 1016 may include a tangible computer-readable storage medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1022 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1000. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device comprising:
    a processing system including a processor; and
    a memory that stores executable instructions that, when executed by the processing system, facilitate performance of operations comprising:
    obtaining information regarding a user device on a network, the information comprising capabilities of the user device and a usage profile of the user device,
    adjusting a level of service quality provided to the user device in accordance with at least one of the capabilities and the usage profile, resulting in an adjusted level of service quality, the adjusting comprising:
        specifying an allowable delay for handling communications traffic from the user device, in accordance with a latency tolerance of the user device;
        specifying a permitted number of transmissions from the user device per unit time, and
        altering a routing of the transmissions to or from the user device; and
    enabling the transmissions in accordance with a capacity level of the network,
    wherein the network is partitioned so that the adjusted level of service quality is provided by a first portion of the network having a predetermined level of network resources, the adjusted level of service quality comprising a first level while the user device is in an active state and a second level while the user device is in an inactive state, the first level being higher than the second level, and
    wherein the first level and the second level are lower than a level of service quality provided by a second portion of the network.

2. The device of claim 1, wherein the operations further comprise determining a level of excess capacity of the network.

3. The device of claim 2, wherein the transmissions are enabled only when the level of excess capacity exceeds a predetermined level.

4. The device of claim 1, wherein the level of service quality is reduced responsive to a request from the user device, resulting in a reduced level of service quality, and wherein the first portion of the network comprises a first node having a performance profile in accordance with the reduced level of service quality.

5. The device of claim 4, wherein the first node is configured to provide access to the network by a first number of user devices, and wherein the first number is greater than a second number of user devices accommodated at a second node in a second portion of the network.

6. The device of claim 1, wherein the operations further comprise monitoring a level of network utilization for the network.

7. The device of claim 1, wherein the adjusting further comprises adjusting a latency criterion regarding connection of the user device to the network.

8. The device of claim 7, wherein the operations further comprise providing a response to a request for connection to the network, wherein the response is delayed relative to the request in accordance with the adjusted latency criterion so that the response is provided when the level of network utilization is lower than at a time of receiving the request.

9. The device of claim 1, wherein the usage profile includes historical data regarding the transmissions over the network to or from the user device, and wherein the operations further comprise predicting a transition of the user device between the active state and the inactive state based on the historical data.

10. The device of claim 1, wherein the user device is in the active state in order to test connectivity to the network during a manufacturing process of the user device, and subsequently enters the inactive state.

11. A method comprising:
  obtaining, by a processing system including a processor, information regarding a user device on a network, the information comprising capabilities of the user device and a usage profile of the user device,
  monitoring, by the processing system, a level of network utilization for the network;
  adjusting, by the processing system, a level of service quality provided to the user device in accordance with at least one of the capabilities and the usage profile, resulting in an adjusted level of service quality, the adjusting comprising:
    specifying an allowable delay for handling communications traffic from the user device, in accordance with a latency tolerance of the user device, and
    altering a routing of transmissions to or from the user device; and
  enabling, by the processing system, the transmissions in accordance with a capacity level of the network,
  wherein the network is partitioned so that the adjusted level of service quality is provided by a first portion of the network having a predetermined level of network resources, the adjusted level of service quality comprising a first level while the user device is in an active state and a second level while the user device is in an inactive state, the first level being higher than the second level, and
  wherein the first level and the second level are lower than a level of service quality provided by a second portion of the network.

12. The method of claim 11, further comprising determining, by the processing system, a level of excess capacity of the network, wherein the transmissions are enabled only when the level of excess capacity exceeds a predetermined level.

13. The method of claim 11, wherein the level of service quality is reduced responsive to a request from the user device, resulting in a reduced level of service quality, wherein the first portion of the network comprises a first node having a performance profile in accordance with the reduced level of service quality, wherein the first node is configured to provide access to the network by a first number of user devices, and wherein the first number is greater than a second number of user devices accommodated at a second node in a second portion of the network.

14. The method of claim 11, wherein the adjusting further comprises adjusting a latency criterion regarding connection of the user device to the network, and further comprising providing, by the processing system, a response to a request for connection to the network, wherein the response is delayed relative to the request in accordance with the adjusted latency criterion.

15. The method of claim 11, wherein the user device is in the active state in order to test connectivity to the network during a manufacturing process of the user device, and subsequently enters the inactive state.

16. A non-transitory machine-readable medium comprising executable instructions that, when executed by a processing system including a processor, facilitate performance of operations comprising:
  obtaining information regarding a user device on a network, the information comprising capabilities of the user device and a usage profile of the user device;
  adjusting a level of service quality provided to the user device in accordance with at least one of the capabilities and the usage profile, resulting in an adjusted level of service quality, the adjusting comprising:
    specifying an allowable delay for handling communications traffic from the user device, in accordance with a latency tolerance of the user device,
    specifying a permitted number of transmissions over the network from the user device per unit time, and
    altering a routing of the transmissions to or from the user device; and
  enabling the transmissions in accordance with a capacity level of the network, wherein the network is partitioned so that the adjusted level of service quality is provided by a first portion of the network having a predetermined level of network resources, the adjusted level of service quality comprising a first level while the user device is in an active state and a second level while the user device is in an inactive state, the first level being higher than the second level, wherein the first level and the second level are lower than a level of service quality provided by a second portion of the network.

17. The non-transitory machine-readable medium of claim 16, wherein the operations further comprise determining a level of excess capacity of the network, wherein the transmissions are enabled only when the level of excess capacity exceeds a predetermined level.

18. The non-transitory machine-readable medium of claim 16, wherein the level of service quality is reduced responsive to a request from the user device, resulting in a reduced level of service quality, wherein the first portion of the network comprises a first node having a performance profile in accordance with the reduced level of service quality, wherein the first node is configured to provide access to the network by a first number of user devices, and wherein the first number is greater than a second number of user devices accommodated at a second node in a second portion of the network.

19. The non-transitory machine-readable medium of claim 16, wherein the adjusting further comprises adjusting a latency criterion regarding connection of the user device to the network, and wherein the operations further comprise providing a response to a request for connection to the network, wherein the response is delayed relative to the request in accordance with the adjusted latency criterion.

20. The non-transitory machine-readable medium of claim 16, wherein the user device is in the active state in order to test connectivity to the network during a manufacturing process of the user device, and subsequently enters the inactive state.

\* \* \* \* \*